(12) United States Patent
Teoh et al.

(10) Patent No.: US 7,853,080 B2
(45) Date of Patent: Dec. 14, 2010

(54) SYSTEM AND METHOD FOR IDENTIFYING AND LABELING CLUSTER PIXELS IN A FRAME OF IMAGE DATA FOR OPTICAL NAVIGATION

(75) Inventors: Edward Kah Ching Teoh, Selangor (MY); Zi Hao Tan, Kelantan (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 949 days.

(21) Appl. No.: 11/684,516

(22) Filed: Mar. 9, 2007

(65) Prior Publication Data

US 2008/0219566 A1    Sep. 11, 2008

(51) Int. Cl.
*G06K 9/34*    (2006.01)

(52) U.S. Cl. ...................................................... 382/180

(58) Field of Classification Search ................. 382/103, 382/153; 342/62–66, 160–162; 348/113, 348/116–119; 701/28; 702/92–95; 244/3.15–3.16, 244/3.19; 901/46–47
See application file for complete search history.

(56) References Cited

U.S. PATENT DOCUMENTS

| 4,887,223 | A | * | 12/1989 | Christian | ...................... 382/153 |
| 5,657,251 | A | * | 8/1997 | Fiala | ........................... 342/162 |
| 5,734,736 | A | * | 3/1998 | Palmer et al. | ............... 382/103 |
| 2004/0202363 | A1 | | 10/2004 | Cowperthwaite et al. | |

\* cited by examiner

*Primary Examiner*—Jose L Couso

(57) ABSTRACT

A system and method for identifying and labeling cluster pixels in a frame of image data for optical navigation determines whether a current pixel of the frame of image data is a cluster pixel and uses neighboring pixels of the current pixel to label the current pixel as belonging to a new cluster or an existing cluster.

20 Claims, 7 Drawing Sheets

FIG.6A

Parameter Calculation:

| | y1 y1 y1 y1 y1 y1 y1 y1 y1 y1 | | | | | | | | | | y2 y2 y2 y2 y2 y2 y2 y2 y2 y2 | | | | | | | | | |
|---|---|---|---|---|---|---|---|---|---|---|---|---|---|---|---|---|---|---|---|
| | x1 | x2 | x3 | x4 | x5 | x6 | x7 | x8 | x9 | x10 | x1 | x2 | x3 | x4 | x5 | x6 | x7 | x8 | x9 | x10 |
| cluster [1] | | | | | | | | | | | | | | | | | | | | |
| pixel_count | 0 | | | 1 | | | | | | | | | | 2 | 6 | 7 | 8 | | | |
| boundary_x1 | 0 | | | 3 | | | | | | | | | | 3 | 3 | 3 | 3 | | | |
| boundary_y1 | 0 | | | 1 | | | | | | | | | | 1 | 1 | 1 | 1 | | | |
| boundary_x2 | 0 | | | 3 | | | | | | | | | | 3 | 7 | 7 | 7 | | | |
| boundary_y2 | 0 | | | 1 | | | | | | | | | | 2 | 2 | 2 | 2 | | | |
| total_x | 0 | | | 3 | | | | | | | | | | 6 | 28 | 33 | 39 | | | |
| total_y | 0 | | | 1 | | | | | | | | | | 3 | 8 | 10 | 12 | | | |
| cluster [2] | | | | | | | | | | | | | | | | | | | | |
| pixel_count | 0 | | | | | 1 | 2 | 3 | | | | | | 0 | | | | | | |
| boundary_x1 | 0 | | | | | 5 | 5 | 5 | | | | | | 0 | | | | | | |
| boundary_y1 | 0 | | | | | 1 | 1 | 1 | | | | | | 0 | | | | | | |
| boundary_x2 | 0 | | | | | 5 | 6 | 7 | | | | | | 0 | | | | | | |
| boundary_y2 | 0 | | | | | 1 | 1 | 1 | | | | | | 0 | | | | | | |
| total_x | 0 | | | | | 5 | 11 | 18 | | | | | | 0 | | | | | | |
| total_y | 0 | | | | | 1 | 2 | 3 | | | | | | 0 | | | | | | |
| cluster [3] | | | | | | | | | | | | | | | | | | | | |
| pixel_count | 0 | | | | | | | | 1 | | | | | 0 | | | | | 2 | 3 |
| boundary_x1 | 0 | | | | | | | | 10 | | | | | 0 | | | | | 9 | 9 |
| boundary_y1 | 0 | | | | | | | | 1 | | | | | 0 | | | | | 1 | 1 |
| boundary_x2 | 0 | | | | | | | | 10 | | | | | 0 | | | | | 10 | 10 |
| boundary_y2 | 0 | | | | | | | | 1 | | | | | 0 | | | | | 2 | 2 |
| total_x | 0 | | | | | | | | 10 | | | | | 0 | | | | | 19 | 29 |
| total_y | 0 | | | | | | | | 1 | | | | | 0 | | | | | 3 | 5 |

FIG.6B

SYSTEM AND METHOD FOR IDENTIFYING AND LABELING CLUSTER PIXELS IN A FRAME OF IMAGE DATA FOR OPTICAL NAVIGATION

BACKGROUND OF THE INVENTION

In typical systems for optical navigation, frames of image data are sequentially captured and compared to track displacements of features in the frames relative to the optical navigation system. These relative displacements of the features in the frames can be used to estimate the motion of the features relative to the optical navigation system or the motion of the optical navigation system relative to the features. In some applications, these features may be beacons (e.g., infrared sources) that are captured and used as reference points for optical navigation. This type of optical navigation technique will be referred to herein as a beacon-based navigation technique. Beacon-based navigation techniques are currently used in computer gaming systems to track motion of remote control devices for the gaming systems.

In a beacon-based navigation technique, the imaged beacons or beacon clusters in the captured frames of image data are identified in order to estimate any displacement of the beacon clusters between the captured frames. The beacon sources are usually stationary, and thus, serve as reference points to determine motion of the optical navigation system. In a conventional process for identifying beacon clusters in a captured frame of image data, the entire image frame is transferred to a random access memory (RAM) to search for the beacon clusters within the captured frame. That is, all pixel values of the frame of image data are transferred to the RAM for processing so that each pixel value can be examined to determine whether that pixel value belongs to a beacon cluster.

A concern with the above process for identifying beacon clusters in a captured frame of image data is that the required size of the RAM is relatively large, which adds significant cost to the optical navigation system. Furthermore, since the required size of the RAM must be at least the size of each captured frame of image data, a larger RAM is needed if the resolution of the captured frames is increased.

Thus, there is a need for a system and method for identifying features, such as beacon clusters, in captured frames of image data for optical navigation that reduces the required size of memory to process the pixels of the captured image frames.

SUMMARY OF THE INVENTION

A system and method for identifying and labeling cluster pixels in a frame of image data for optical navigation determines whether a current pixel of the frame of image data is a cluster pixel and uses neighboring pixels of the current pixel to label the current pixel as belonging to a new cluster or an existing cluster. The process of labeling the current pixel in accordance with embodiments of the invention saves memory, which translates into reduction in system cost.

A method for identifying and labeling cluster pixels in a frame of image data for optical navigation in accordance with an embodiment of the invention comprises determining whether a current pixel of the frame of image data is a cluster pixel, determining whether any of neighboring pixels of the current pixel is labeled as belonging to at least one existing cluster, labeling the current pixel as belonging to a new cluster if none of the neighboring pixels of the current pixel is labeled as belonging to the at least one existing cluster, and labeling the current pixel as belonging to a particular cluster of the at least one existing cluster if at least one of the neighboring pixels of the current pixel is labeled as belonging to the at least one existing cluster.

A system for optical navigation in accordance with an embodiment of the invention comprises an image sensor and a navigation engine. The image sensor is configured to capture a frame of image data. The navigation engine is operatively connected to the image sensor to identify and label cluster pixels in the frame of image data. The navigation engine is configured to determine whether a current pixel of the frame of image data is a cluster pixel. The navigation engine is further configured to determine whether any of neighboring pixels of the current pixel is labeled as belonging to at least one existing cluster. The navigation engine is configured to label the current pixel as belonging to a new cluster if none of the neighboring pixels of the current pixel is labeled as belonging to the at least one existing cluster and to label the current pixel as belonging to a particular cluster of the at least one existing cluster if at least one of the neighboring pixels of the current pixel is labeled as belonging to the at least one existing cluster.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIG. 6A shows contents of a label array as pixels of the frame of image data of FIG. 3 are processed in accordance with an embodiment of the invention.

FIG. 6B shows parameter calculations for different clusters as the pixels of the frame of image data of FIG. 3 are processed in accordance with an embodiment of the invention.

DETAILED DESCRIPTION

Figure 1:
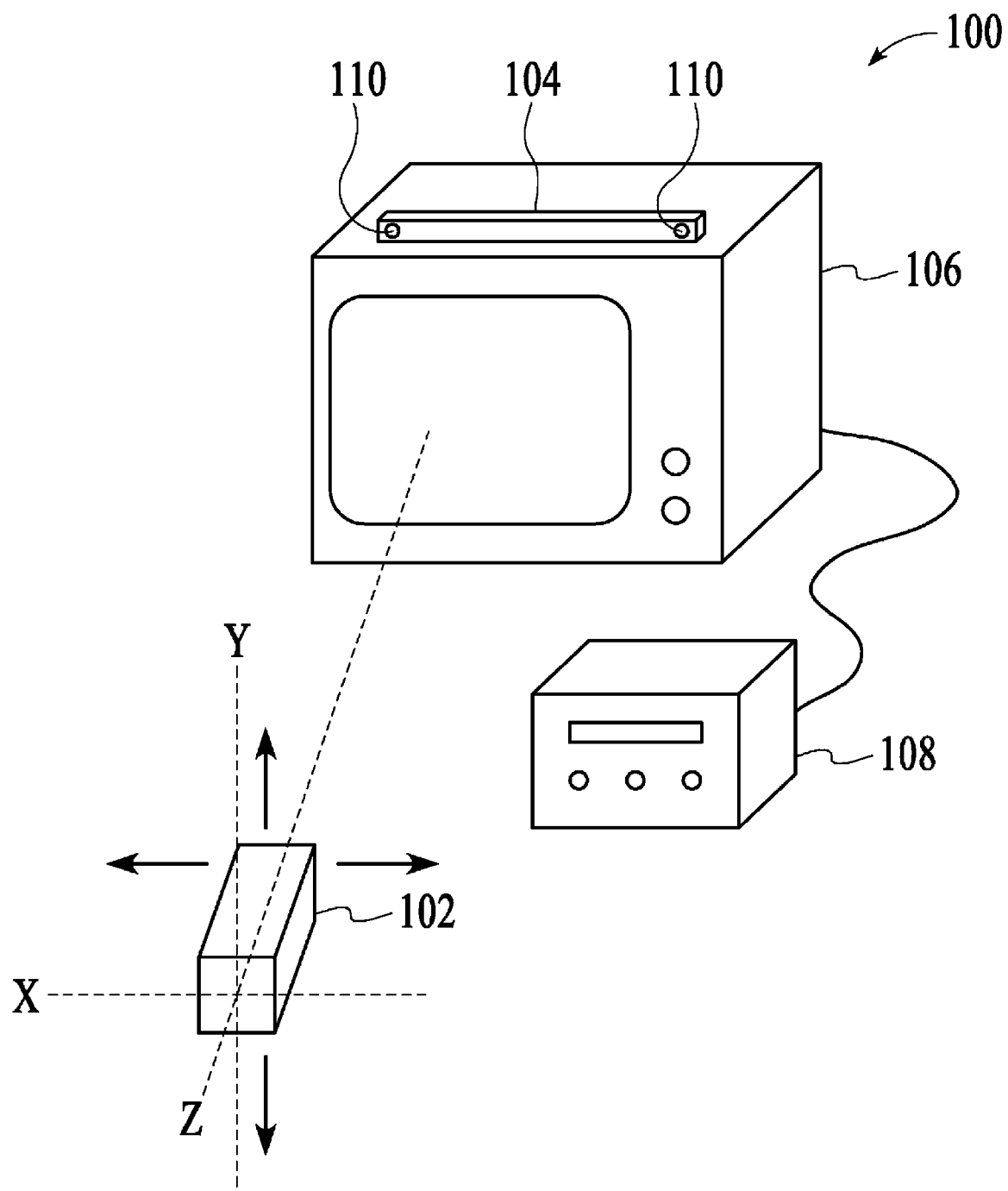
FIG. 1 shows an optical navigation system in accordance with an embodiment of the invention.

With reference to FIG. 1, an optical navigation system 100 in accordance with an embodiment of the invention is described. In this embodiment, the optical navigation system 100 operates to navigate using imaged beacons in captured frames of image data. That is, the optical navigation system 100 uses a beacon-based navigation technique for optical navigation. Thus, in operation, the optical navigation system 100 processes the captured frames of image data in order to identify and label pixels in the captured frames that belong to imaged beacon sources, which are sometimes referred herein as beacon clusters or simply clusters. As described in more detail below, the optical navigation system 100 processes pixels of a captured frame in an efficient manner, which requires a small amount memory.

As shown in FIG. 1, the optical navigation system 100 includes a controller unit 102, a beacon unit 104, a display device 106 and a console unit 108. In some embodiments, the console unit 108 is coupled to the display device 106 using conventional wiring. Alternatively, other wired or wireless connections may be implemented. In some embodiments, the controller unit 102 and the console unit 108 are part of a gaming system. Alternatively, the optical navigation system 100 may be used to implement other types of systems. For example, some embodiments of the optical navigation system 100 may be used to provide an accessible user interface for a computer system.

The controller unit 102 is configured to calculate the relative position of the controller unit with respect to the beacon unit 104. The controller unit 102 is designed to perform the positional calculation using the beacon unit 104 as a reference. The beacon unit 104 includes multiple beacon light sources 110, which are used as reference points by the controller unit 102 to calculate the relative position of the controller unit. In an embodiment, the beacon light sources 110 of the beacon unit 104 are infrared (IR) or visible light sources, such as light-emitting diodes (LEDs), laser diodes, etc. In the illustrated embodiment, the beacon unit 104 includes two beacon light sources 110. However, in other embodiments, the beacon unit 104 may include more than two beacon light sources. The controller unit 102 operates to electronically capture the beacon light sources 110 of the beacon unit 104 in frames of image data. The controller unit 102 then processes the captured frames of image data to identify and label the imaged beacon light sources in the captured frames. Changes in the position of the imaged beacon light sources between the captured frames of image data are used to output position data, which indicates the relative position of the controller unit 102 within the coordinate system of the optical navigation system 100. The coordinate system of the optical navigation system 100 may be established during a calibration stage. The output position data may be x, y and z position values along the X, Y and Z axes of the optical navigation system. Alternatively, the output position data may be $\Delta x$, $\Delta y$ and $\Delta z$ values along the X, Y and Z axes of the optical navigation system 100, which represent changes or displacements along the respective axes.

The position data of the controller unit 102 is transmitted to the console unit 108. The console unit 108 processes the position data for use in a particular application. As an example, the console unit 108 may be configured to manipulate a graphical element displayed on the display device 106 according to the movements of the controller unit 102 as new position data is received from the controller unit. The console unit 108 may be a computer system, which runs one or more computer programs, such as gaming programs. In this embodiment, the console unit 108 may include components commonly found in a personal computer system.

Figure 2:
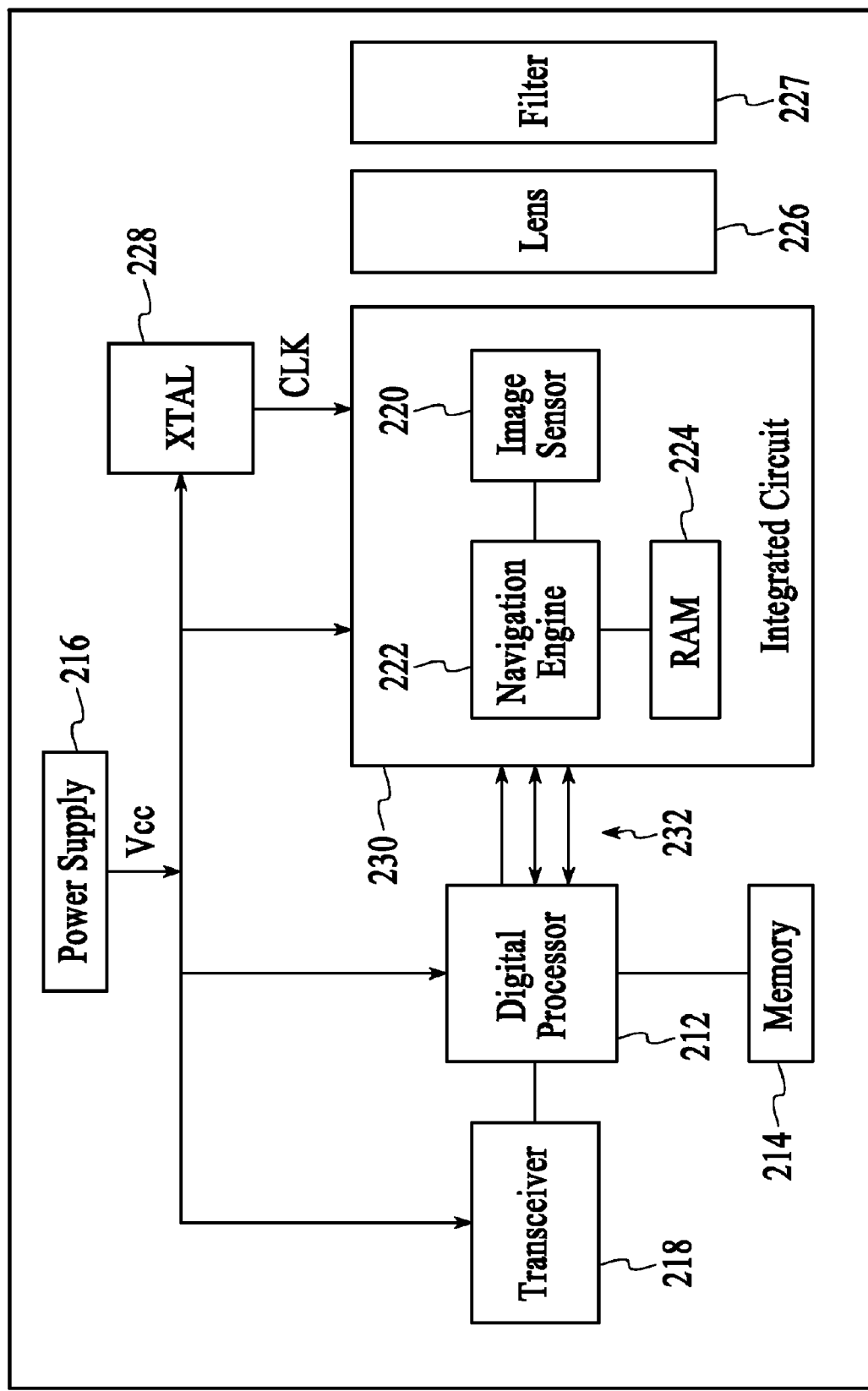
FIG. 2 is a block diagram of a controller unit included in the optical navigation system of FIG. 1.

Turning now to FIG. 2, a block diagram of the controller unit 102 in accordance with an embodiment of the invention is shown. The illustrated controller unit 102 includes a digital processor 212, a memory device 214, a power supply 216, a transceiver 218, an image sensor 220, a navigation engine 222, random access memory (RAM) 224, an optical lens 226, an optical filter 227 and a crystal oscillator 228. In the illustrated embodiment, the navigation engine 222, the RAM 224 and the image sensor 226 are part of an integrated circuit (IC) 230. However, in other embodiments, at least two of the image sensor 220, the navigation engine 222 and the RAM 224 may be implemented as separate components. The IC 230 is connected to the digital processor 212 via one or more signal lines 232, which may include address, data and/or control signal lines. Although the controller unit 102 is shown to include certain components, the controller unit may include additional components. For example, some embodiments of the controller unit 102 include input buttons, joysticks or other selectors typically used for gaming controllers. Other embodiments of the controller unit 102 include feedback signal generators to generate a tactile or auditory feedback signal to a user.

In some embodiments, the digital processor 212 may be a general-purpose processor such as a microprocessor or microcontroller. In other embodiments, the digital processor 212 may be a special-purpose processor such as a digital signal processor. In other embodiments, the digital processor 212 may be another type of controller or a field programmable gate array (FPGA). In general, the digital processor 212 implements operations and functions of the controller unit 102.

The memory device 214 is configured to store data and/or instructions for use in the operation of the controller unit 102. In some embodiments, the memory device 214 stores instructions, which when executed by the digital processor 212, cause the digital processor to perform certain operations. Similarly, some instructions may be stored in memory integrated into the digital processor 212. Additionally, the memory device 214 may store position data produced by the digital processor 212 and/or the navigation engine 222.

In an embodiment, the power supply 216 provides direct current (DC) electrical signal, Vcc, to the digital processor 212, as well as other components of the controller unit 102. Some embodiments of the power supply 216 include one or more batteries. In some embodiments, the power supply 216 receives power from the console unit 108 via a wire. In a similar manner, the crystal oscillator 228 provides a clock signal, CLK, to one or more of the components of the controller unit 102.

The transceiver 218, which is coupled to the digital processor 212, is configured to transmit signals such as position data signals from the controller unit 102 to the console unit 108. The transceiver 218 is also configured to receive control signals, or feedback signals, from the console unit 108. Additionally, the transceiver may facilitate wired or wireless communications. For example, the transceiver 218 may send electrical signals via a hard-wired connection to the console unit 108. Alternatively, the transceiver 218 may send wireless signals, such as radio frequency (RF) signals, using known wireless data transmission protocols.

The image sensor 220, which is also coupled to the digital processor 212, is configured to capture frames of image data. The image sensor 220 includes an electronic imaging sensor array, such as a complimentary metal-oxide-semiconductor (CMOS) image sensor array or a charge-coupled device (CCD) image sensor array. For example, the image sensor may include a 30×30 pixel array to capture frames of image data with a relatively low resolution. However, other embodiments of the image sensor 220 may include an increased pixel array size for higher resolution frames of image data. In the depicted embodiment, the image sensor 220 is used in conjunction with the optical lens 226 and the optical filter 227. The optical lens 226 is used to focus an image onto the image sensor 220. The optical filter 227 is used to selectively filter out undesired light and to selectively transmit the light from the beacon light sources 110 of the beacon unit 104 and so that the light from the beacon light sources 110 can be imaged by the image sensor 220. As an example, the optical filter 227 may be an IR or color filter. However, other embodiments may omit the optical lens 226 and/or the optical filter 227, or implement multiple optical lenses and/or optical filters.

In the illustrated embodiment, the navigation engine 222 is integrated with the image sensor 220 and the RAM 224 on the IC 230. In other embodiments, the navigation engine 222 may be partially or wholly integrated with the digital processor 212. In general, the navigation engine 222 processes frames of image data captured by the image sensor 220 to compute and output current position data with respect to the controller unit 102. During this process, the navigation engine 222 performs an operation that includes identification and labeling of feature clusters in the captured frames of image data, e.g., clusters of imaged beacon sources in the captured frames. As described in more detail below, this operation involves the use of the RAM 224 in an efficient manner, which reduces the required size of the RAM. Once the feature clusters in the captured frames are identified and labeled, these clusters are used to compute the position data.

Figures 3, 5:
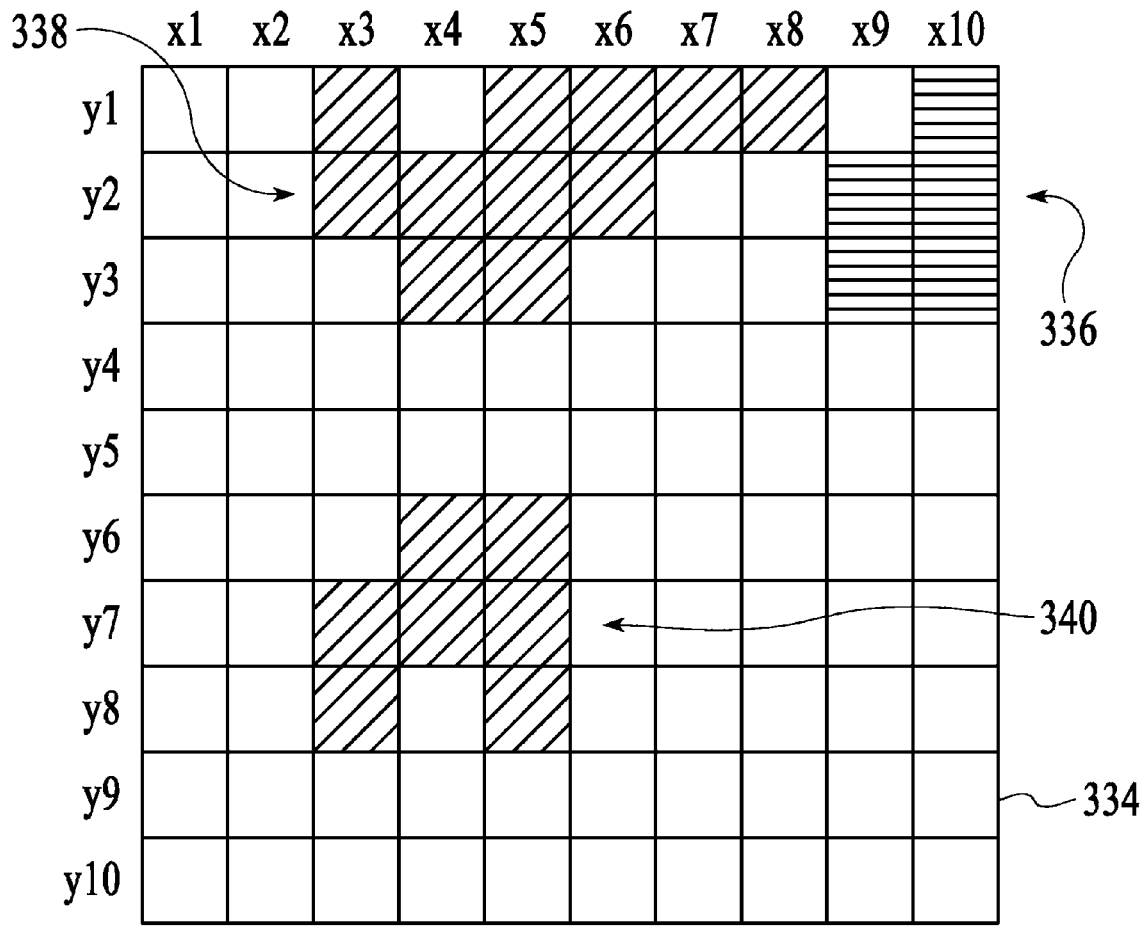
FIG. 3 shows a 10×10 sensor array that includes a frame of image data with three feature clusters as an example to illustrate an operation of a navigation engine of the controller unit in accordance with an embodiment of the invention.
FIG. 5 shows the neighboring pixels of a current pixel, which are examined and/or processed in order to label the current pixel as belonging to a feature cluster in accordance with an embodiment of the invention.

The operation of the navigation engine 222 with respect to identification and labeling of feature clusters is described with reference to a 10×10 sensor array 334 of FIG. 3, which may be included in the image sensor 220, as an example and to a process flow diagram of FIG. 4. In FIG. 3, the sensor array 334 includes captured data in each of the pixels. In an embodiment, each data in a pixel of the sensor array 334 is a luminance or intensity value captured in that pixel. Thus, in this example, the captured frame of image data is a 10×10 pixel image frame. As shown in FIG. 3, the captured frame includes three feature clusters 336, 338 and 340, which may represent imaged beacon sources. In an embodiment, a pixel of a frame of image data is considered to belong to a feature cluster if that pixel has a luminance value greater than a predefined threshold value. As explained in more detail below, the navigation engine 222 first identifies a pixel as belonging to a feature cluster and then labels that pixel into the proper feature cluster, assuming that there is more than one feature cluster. In addition, the navigation engine 222 performs parameter calculation of each feature cluster as the pixels of the image frame are processed.

Figure 4:
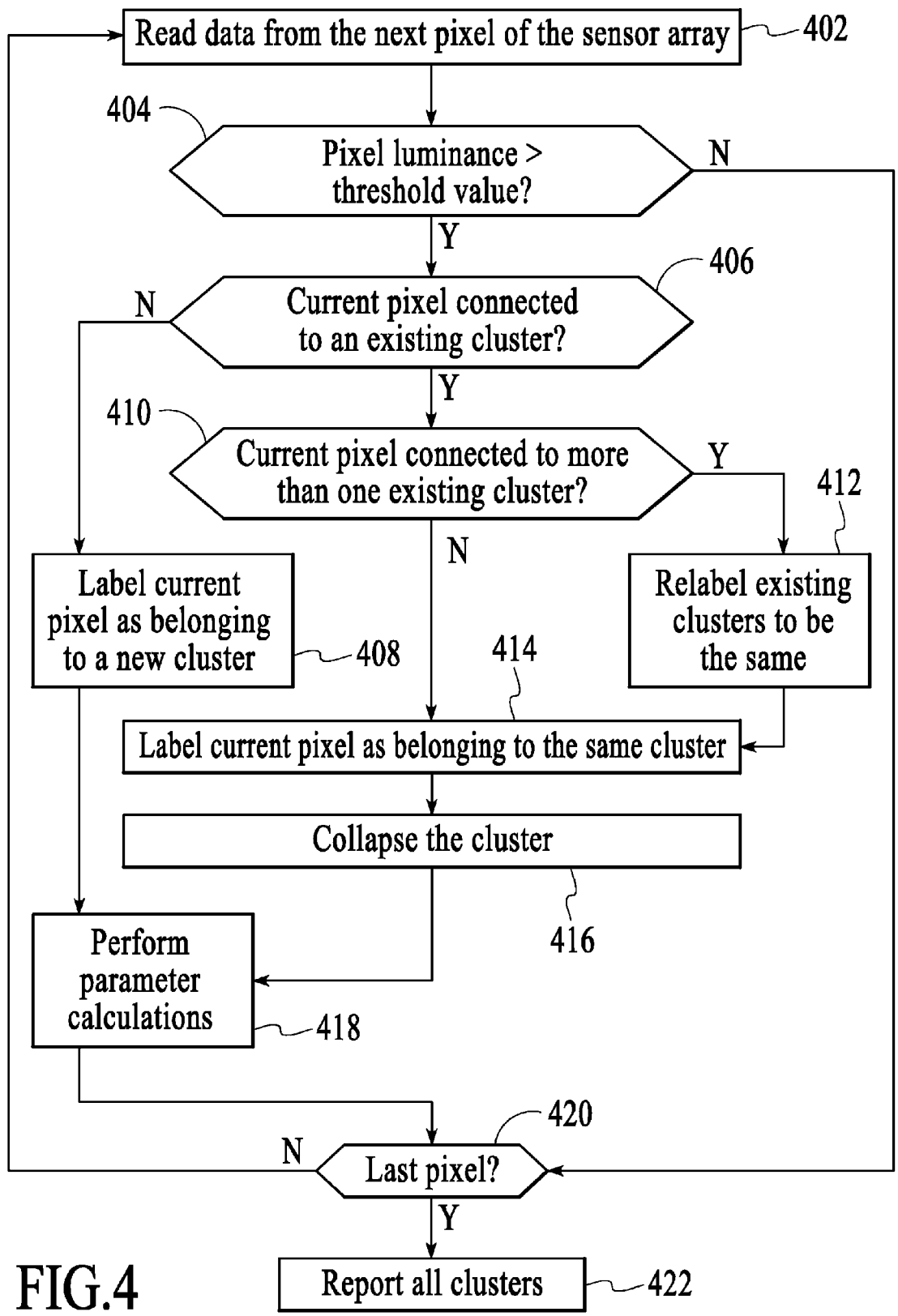
FIG. 4 is a process flow diagram of an operation of the navigation engine in accordance with an embodiment of the invention.

As shown in FIG. 4, the operation of the navigation engine 222 begins at block 402, where data from the next pixel of the sensor array 334 is read. The pixel from which the pixel data is read is the current pixel of the sensor array 334 being processed by the navigation engine 222. The pixel data includes at least the luminance value of the current pixel. The pixel data is read from the sensor array 334 from left to right beginning from the top row down to the bottom row. Thus, the first pixel data to be read is the data from the pixel (x1, y1) shown in FIG. 3.

Next, at block 404, a determination is made whether the pixel luminance value of the current pixel is greater than a threshold value. The pixels with the luminary value greater than the threshold value are considered "cluster pixels" or pixels that belong to one or more features clusters. If the pixel luminance value is not greater than the threshold value, then the operation proceeds to block 420. If the pixel luminance value is greater than the threshold value, then the operation proceeds to block 406.

At block 406, a determination is made whether the current pixel is connected to an existing feature cluster. This determination is made by examining label information associated with neighboring pixels about the current pixel. The neighboring pixels about the current pixel are pixels that are immediately next to the current pixel. In some embodiments, only selected neighboring pixels of the current pixel are examined to determine if the current pixel is connected to an existing feature cluster. In an embodiment, only the neighboring pixels that are above the current pixel and the neighboring pixel to the immediate right of the current pixels are examined. This is illustrated in FIG. 5, which shows a current pixel and the neighboring pixels [1], [2], [3] and [4]. In this embodiment, only the immediate left neighboring pixel [1], the upper left neighboring pixel [2], the immediate upper neighboring pixel [3] and the upper right neighboring pixel [4] are examined in order to determine whether the current pixel is connected to an existing feature cluster. Consequently, the navigation engine 222 needs to store cluster information regarding the neighboring pixels [1], [2], [3] and [4] for the current pixel. Thus, for each pixel being processed, cluster information for similarly positioned neighboring pixels with respect to that pixel needs to be stored and accessed.

Turning back to FIG. 4, if it is determined at block 406 that the current pixel is not connected to an existing feature cluster, the operation proceeds to block 408, where the current pixel is labeled as belonging to a new feature cluster. The operation then proceeds to block 418. However, if it is determined at block 406 that the current pixel is connected to an existing feature cluster, the operation proceeds to block 410, where a determination is made whether the current pixel is connected to more than one feature cluster. That is, a determination is made whether two or more of the neighboring pixels belong to different feature clusters. If the current pixel is connected to more than one feature cluster, then the different feature clusters of the neighboring pixels, as well as other selected previously processed pixels, are relabeled as the same feature cluster, at block 412. That is, the neighboring pixels and other selected previously processed pixels that have been labeled as belonging to the different feature clusters are relabeled as belonging to the same feature cluster. In an embodiment, only the neighboring pixels that are above the current pixel and the neighboring pixel to the immediate left of the current pixel, and two nearby pixels that are to the right of the upper right neighboring pixel are relabeled, if appropriate. This is illustrated in FIG. 5, which shows the current pixel, the neighboring pixels [1], [2], and [4], and the nearby pixels [5] and [6]. In an embodiment, the different feature clusters are relabeled as the earliest existing feature cluster used to label the neighboring pixels. The operation then proceeds to block 414.

At block 414, the current pixel is labeled as belonging to the same existing feature cluster. If the current pixel is connected to only a single existing feature cluster, then the current pixel is labeled as belonging to that existing feature cluster. If the current pixel is connected to more than one existing feature cluster, then the current pixel is labeled as belonging to the relabeled feature cluster.

Next, at block 416, the existing feature cluster of the current pixel is collapsed. Next, at block 418, parameter calculations are performed for the feature cluster of the current pixel. In an embodiment, the parameter calculation includes total_x value, total_y value, pixel_count value, boundary_x1 value, boundary_y1 value, boundary_x2 value and boundary_y2 value. The total_x value is the sum of x coordinate values of the pixels that belong to the feature cluster. The total_y value is the sum of y coordinate values of the pixels that belong to the feature cluster. The pixel_count value is the number of pixels that belong to the feature cluster. The boundary_x1 value, boundary_y1 value, boundary_x2 value and boundary_y2 values are the rectangular boundary values for the feature cluster, which include the smallest x and y coordinate values, i.e., the boundary_x1 and boundary_y1 values, and the largest x and y coordinate values, i.e., the boundary_x2 and boundary_y2 values, of the pixels that belong to the feature cluster.

Next, at block 420, a determination is made whether the current pixel is the last pixel in the sensor array 334. If the current pixel is not the last pixel, then the operation proceeds back to block 402, where the next pixel is read from the sensor array to be processed. If the current pixel is the last pixel, then the operation proceeds to block 422, where all the feature clusters are reported in order to perform navigation.

Figure 6A:
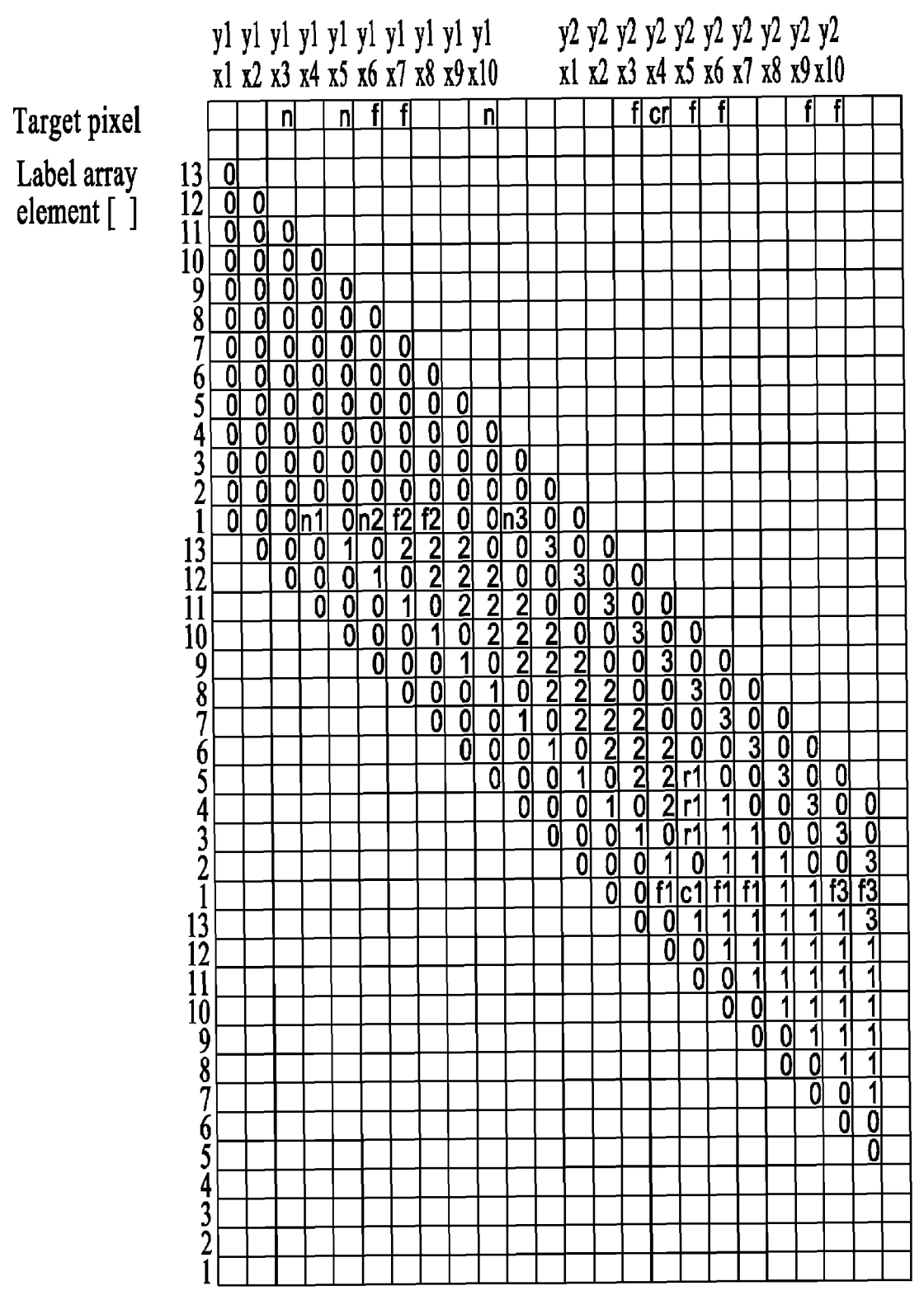

During the operation of the navigation engine, the RAM 224 is used to store cluster-label information of the current pixel and some of the previously processed pixels. As used herein, cluster-label information includes any information that associates a pixel to one or more feature clusters. The use of the RAM 24 is described with respect to the 10×10 sensor array 334 of FIG. 3 as an example. The RAM 224 is used to store the cluster-label information of selected pixels of the sensor array 334 in a label array. In an embodiment, the depth of the label array is equal to the width of the sensor array plus three (3). Thus, for the 10×10 sensor array 334 of FIG. 3, the depth of the label array is ten (10) plus three (3), or thirteen (13). However, in other embodiments, the depth of the label array may be smaller or larger. FIG. 6A shows the contents of the label array, which is stored in the RAM 224, as the pixels of the sensor array 334 are processed. In the illustrated embodiment, the label array includes label array elements [1]-[13]. In FIG. 6A, "n" refers to "new label number", "r" refers to "relabel to collapsed label number", "c" refers to "combine label numbers" and "f" refers to "follow previous label number." FIG. 6B shows parameter calculations for different feature clusters found in the sensor array 334 as the pixels of the sensor array are processed. The parameter calculations may be stored in the RAM 224 or in another storage device, such as the memory device 214. In FIGS. 6A and 6B, only the results from the pixels of the first two rows of the sensor array 334 are shown for illustration. The remaining pixels of the sensor array 334 are processed in a similar manner.

Initially, the label array is set to contain all zeros and the parameter calculations are also set to zero, as shown in the column "y1 x1" in FIGS. 6A and 6B. As shown in FIG. 3, the pixels in the first two rows of the sensor array 334 that are identified as pixels belonging to a feature cluster or "cluster pixels" are the pixels with the following coordinates: (x3, y1), (x5, y1), (x6, y1), (x7, y1), (x10, y1), (x3 y2), (x4, y2), (x5, y2), (x6, y2), (x9, y2) and (x10, y2). As illustrated in FIG. 6A, the contents of the label array are shifted by one label array element after each pixel is processed such that the content of a label array element [N] is transferred to the label array element [N−1] except for the content of the label array element [1], which is transferred to the label array element [13].

As illustrated in FIG. 6A, when the current or target pixel (x3, y1) is being processed, the pixel (x3, y1) is labeled as belonging to a new feature cluster, since that pixel is not connected to any existing feature cluster. As a result, the label array element [1] is set to a new label number of "1" to indicate that the target pixel (x3, y1) belongs to a feature cluster [1], as shown in column "y1 x4". The pixels (x5, y1) and (x10, y1) are processed in a similar manner. When the target pixel (x6 y1) is being processed, the pixel (x6 y1) is labeled as belonging to same previous feature cluster, since that pixel is connected to only that feature cluster. As a result, the label array element [1] is set to a same label number of "2" to indicate that the target pixel (x6, y1) belongs to a feature cluster [2], as shown in column "y1 x6". The pixels (x7, y1), (x3, y2), (x5, y2), (x6, y2), (x9, y2) and (x10, y2) are processed in a similar manner. When the target pixel (x4 y2) is being processed, the pixel (x4, y2) is labeled as belonging to a combined label, since that pixel is connected to more than one existing feature cluster. As a result, the label array element [1] is set to the combined label number of "1" to indicate that the target pixel (x4, y2) belongs to the feature cluster [1], as shown in column "y2 x5". In addition, the label array elements [3], [4] and [5] are relabeled to the combined label number of "1" to indicate that the cluster pixels (x5, y1), (x6, y1) and (x7, y1) now belongs to the feature cluster [1], as shown in column "y2 x5". The remaining cluster pixels of the sensor array are processed in a similar manner.

When a cluster pixel is being processed, the parameter calculations are also updated to include the target pixel in the feature cluster to which the target pixel has been labeled, as shown in FIG. 6B. As an example, when the target pixel (x3, y1) is being processed, the parameter calculations for the feature cluster [1] are updated using the information of all cluster pixels that belong to that feature cluster [1], which currently includes only the cluster pixel (x3, y1). As another example, when the target pixel (x4, y2) is being processed, the parameter calculations for the feature cluster [1] are updated using the information of all cluster pixels that now belong to that feature cluster [1], which currently includes the cluster pixels (x3, y1), (x5, y1), (x6, y1), (x7, y1), (x3, y2) and (x4, y2). Thus, as cluster pixels are relabeled, the parameter calculations are performed using all the cluster pixels in a particular feature cluster, including cluster pixels that have been re-labeled. In this fashion, the parameter calculations of the feature clusters are updated when a cluster pixel is processed.

Figure 7:
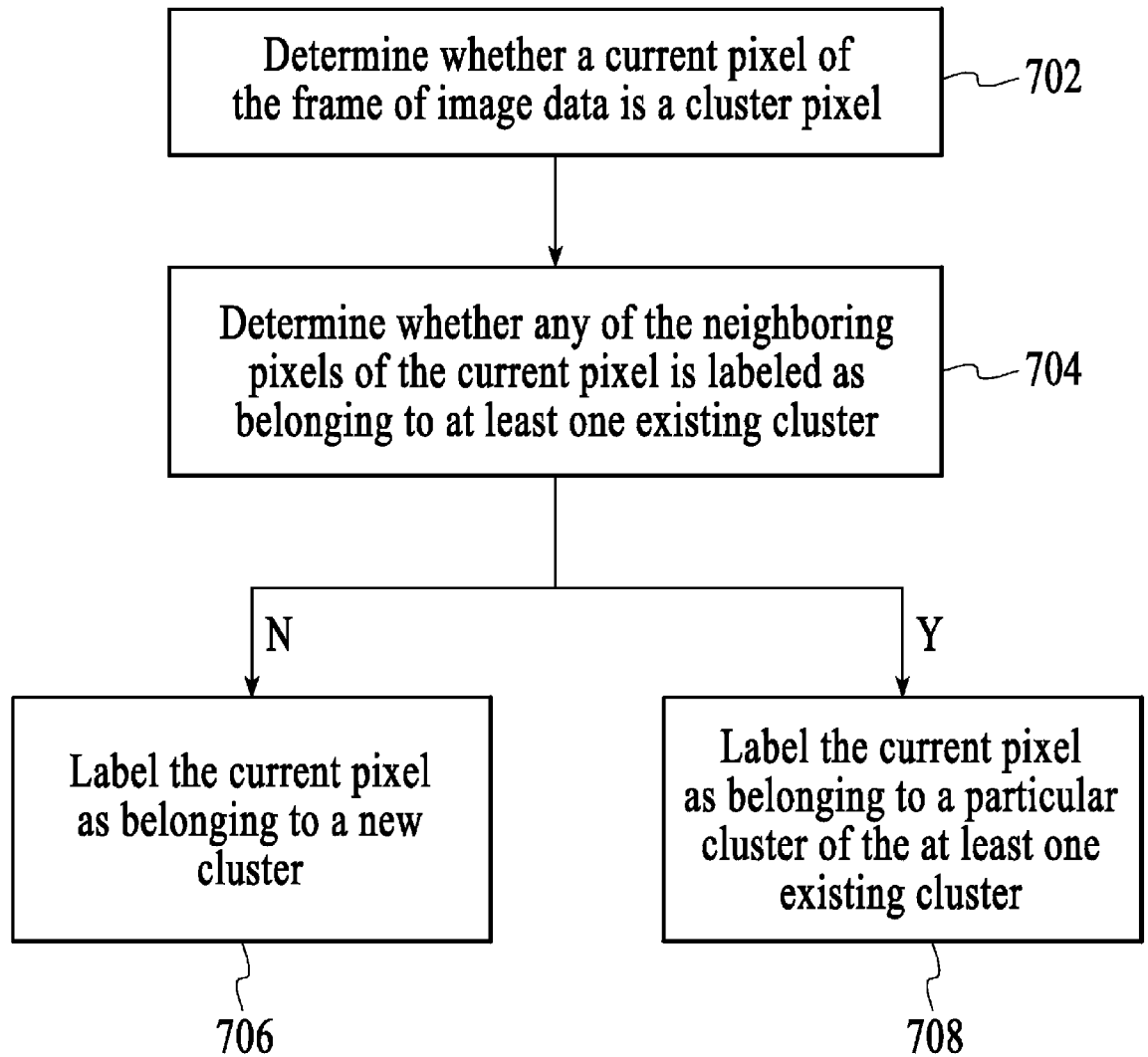
FIG. 7 is a process flow diagram of a method for identifying and labeling cluster pixels in a frame of image data for optical navigation in accordance with an embodiment of the invention.

A method for identifying and labeling cluster pixels in a frame of image data for optical navigation in accordance with an embodiment of the invention is described with reference to a process flow diagram of FIG. 7. At block 702, a determination is made whether a current pixel of the frame of image data is a cluster pixel. As used herein, a cluster pixel is a pixel that belongs to a feature cluster, such an imaged beacon cluster. If the current pixel is not a cluster pixel, then the processing for the current pixel is terminated. Next, at block 704, if the current pixel is a cluster pixel, a determination is made whether any of the neighboring pixels of the current pixel is labeled as belonging to at least one existing cluster. Next, at block 706, the current pixel is labeled as belonging to a new cluster if none of the neighboring pixels of the current pixel is labeled as belonging to at least one existing cluster. Alternatively, at block 708, the current pixel is labeled as belonging to a particular cluster of the at least one existing cluster if at least one of the neighboring pixels of the current pixel is labeled as belonging to the at least one existing cluster.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating an optical navigation system, the method comprising:

capturing a frame of image data from a light source with a sensor;

a controller unit identifying a change in position of a controller unit relative to the light source comprising identifying and labeling cluster pixels in the frame of image data for optical navigation;

the controller unit determining whether a current pixel of the frame of image data is a cluster pixel;

the controller unit determining whether any of neighboring pixels of the current pixel is labeled as belonging to at least one existing cluster; labeling the current pixel as belonging to a new cluster if none of the neighboring pixels of the current pixel is labeled as belonging to the at least one existing cluster; and the controller unit labeling the current pixel as belonging to a particular cluster of the at least one existing cluster if at least one of the neighboring pixels of the current pixel is labeled as belonging to the at least one existing cluster.

2. The method of claim 1 wherein the labeling the current pixel as belonging to the particular cluster includes labeling the current pixel as belonging to the particular cluster if the at least one of the neighboring pixels of the current pixel is labeled as belonging to only the particular cluster.

3. The method of claim 1 wherein the labeling the current pixel as belonging to the particular cluster includes labeling the current pixel as belonging to the particular cluster if the at least one of the neighboring pixels of the current pixel is labeled as belonging to multiple existing clusters, the particular cluster being the earliest cluster of the multiple existing clusters used to label the at least one of the neighboring pixels.

4. The method of claim 1 wherein the determining whether any of the neighboring pixels of the current pixel is labeled as belonging to the at least one existing cluster includes only determining whether any of selected pixels of the neighboring pixels of the current pixel is labeled as belonging to the at least one existing cluster, the selected pixels including the upper left neighboring pixel, the immediate upper neighboring pixel, the upper right neighboring pixel and the immediate left neighboring pixel.

5. The method of claim 1 wherein the labeling the current pixel as belonging to the new cluster or the particular cluster includes storing cluster-label information for the current pixel in a label array.

6. The method of claim 5 wherein the label array includes N label array elements, where the N is equal to or greater than the width of the frame of image data.

7. The method of claim 6 wherein the N is equal to the width of the frame of image data plus three.

8. The method of claim 1 further comprising performing parameter calculations for one of the new cluster and the particular cluster to which the current pixel has been labeled as belonging.

9. The method of claim 8 wherein the parameter calculations include at least one of pixel count information and boundary information for the new cluster or the particular cluster to which the current pixel has been labeled as belonging.

10. The method of claim 1 wherein the determining whether the current pixel of the frame of image data is the cluster pixel includes comparing luminance value of the current pixel to a threshold value.

11. An optical navigation system comprising:
a beacon unit configured to emit light;
a controller unit configured to process the relative position of the controller unit with respect to the beacon unit,
an image sensor coupled to the controller unit and configured to capture a frame of image data of the emitted light and a navigation engine operatively connected to the image sensor to identify and label cluster pixels in the frame of image data, the navigation engine being configured to determine whether a current pixel of the frame of image data is a cluster pixel, the navigation engine being further configured to determine whether any of neighboring pixels of the current pixel is labeled as belonging to at least one existing cluster, the navigation engine being configured to label the current pixel as belonging to a new cluster if none of the neighboring pixels of the current pixel is labeled as belonging to the at least one existing cluster and to label the current pixel as belonging to a particular cluster of the at least one existing cluster if at least one of the neighboring pixels of the current pixel is labeled as belonging to the at least one existing cluster.

12. The optical navigation system of claim 11 wherein the navigation engine is configured to label the current pixel as belonging to the particular cluster if the at least one of the neighboring pixels of the current pixel is labeled as belonging to only the particular cluster.

13. The optical navigation system of claim 11 wherein the navigation engine is configured to label the current pixel as belonging to the particular cluster if said at least one of the neighboring pixels of the current pixel is labeled as belonging to multiple existing clusters, the particular cluster being the earliest cluster of the multiple existing clusters used to label the at least one of the neighboring pixels.

14. The optical navigation system of claim 11 wherein the navigation engine is configured to only determine whether any of selected pixels of the neighboring pixels of the current pixel is labeled as belonging to the at least one existing cluster, the selected pixels including the upper left neighboring pixel, the immediate upper neighboring pixel, the upper right neighboring pixel and the immediate left neighboring pixel.

15. The optical navigation system of claim 11 wherein the navigation engine is configured to store cluster-label information for the current pixel into a label array.

16. The optical navigation system of claim 15 further comprising a random access memory operatively coupled to the navigation engine, the random access memory being used to store the label array.

17. The optical navigation system of claim 15 wherein the label array includes N label array elements, where the N is equal to or greater than the width of the frame of image data.

18. The optical navigation system of claim 17 wherein the N is equal to the width of the frame of image data plus three.

19. The optical navigation system of claim 11 wherein the navigation engine is configured to perform parameter calculations for one of the new cluster and the particular cluster to which the current pixel has been labeled as belonging.

20. The optical navigation system of claim 11 wherein the parameter calculations include at least one of pixel count information and boundary information for the new cluster or the particular cluster to which the current pixel has been labeled as belonging.

* * * * *